(12) United States Patent
Song et al.

(10) Patent No.: US 9,104,376 B2
(45) Date of Patent: Aug. 11, 2015

(54) METHOD OF CONTROLLING OUTPUT OF SCREEN OF FLEXIBLE DISPLAY AND PORTABLE TERMINAL SUPPORTING THE SAME

(71) Applicant: Samsung Electronics Co., Ltd., Suwon-si, Gyeonggi-do (KR)

(72) Inventors: Gajin Song, Anyang-si (KR); Hanjib Kim, Suwon-si (KR); Seokjun Baek, Suwon-si (KR); Yujeong Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/067,106

(22) Filed: Oct. 30, 2013

(65) Prior Publication Data

US 2014/0118317 A1    May 1, 2014

(30) Foreign Application Priority Data

Nov. 1, 2012 (KR) ........................ 10-2012-0123220

(51) Int. Cl.
*G06F 3/041* (2006.01)
*G06F 1/16* (2006.01)
*G06F 1/32* (2006.01)

(52) U.S. Cl.
CPC ............ *G06F 1/1652* (2013.01); *G06F 1/3206* (2013.01); *G06F 1/3265* (2013.01); *G06F 2203/04102* (2013.01); *Y02B 60/1242* (2013.01)

(58) Field of Classification Search
CPC ... G06F 1/1652; G06F 1/3265; G06F 3/0416; G06F 2203/04102
See application file for complete search history.

(56) References Cited

U.S. PATENT DOCUMENTS

| 2010/0060548 | A1* | 3/2010 | Choi et al. ..................... 345/1.3 |
| 2010/0141605 | A1* | 6/2010 | Kang et al. .................... 345/174 |
| 2011/0227822 | A1* | 9/2011 | Shai .............................. 345/156 |
| 2012/0092363 | A1* | 4/2012 | Kim et al. ..................... 345/618 |
| 2012/0169609 | A1* | 7/2012 | Britton ......................... 345/173 |
| 2013/0285922 | A1* | 10/2013 | Alberth et al. ................ 345/173 |
| 2013/0296000 | A1* | 11/2013 | Park et al. ..................... 455/566 |
| 2014/0002419 | A1* | 1/2014 | Thorson et al. ............... 345/175 |
| 2014/0015743 | A1* | 1/2014 | Seo et al. ...................... 345/156 |
| 2014/0055375 | A1* | 2/2014 | Kim et al. ..................... 345/173 |

FOREIGN PATENT DOCUMENTS

KR    10-2009-0036259 A    4/2009

* cited by examiner

*Primary Examiner* — Joe H Cheng
(74) *Attorney, Agent, or Firm* — Jefferson IP law, LLP

(57) ABSTRACT

A terminal supporting control of an output of a screen of a flexible display is provided. The terminal includes a flexible display configured such that at least a portion of the flexible display is deflected or folded, a sensor unit for collecting a sensor signal for detecting a location where the flexible display is deflected or folded, and a controller for controlling to determine a specific area of a functional screen or at least one functional screen from among a plurality of functional screens which are output before the flexible display is deflected or folded as a content viewing area when an input event is received, and for outputting the determined content viewing area in a specific display area of the folded flexible display.

20 Claims, 9 Drawing Sheets

METHOD OF CONTROLLING OUTPUT OF SCREEN OF FLEXIBLE DISPLAY AND PORTABLE TERMINAL SUPPORTING THE SAME

PRIORITY

This application claims the benefit under 35 U.S.C. §119 (a) of a Korean patent application filed on Nov. 1, 2012 in the Korean Intellectual Property Office and assigned Serial No. 10-2012-0123220, the entire disclosure of which is hereby incorporated by reference.

BACKGROUND OF THE INVENTION

1. Field of the Invention

The present invention relates to a flexible display. More particularly, the present invention relates to a method of controlling an output of a screen of a flexible display, wherein the display of a content output on the screen of the flexible display can be adaptively changed, and a terminal supporting the same.

2. Description of the Related Art

Among terminals having a communication function, those small enough to be carried are widely used due to their portability. In recent years, the use of such terminals has dramatically increased due to the expansion of the size of touch screens and the supply of hardware and software by which various content can be provided. The terminals provide various content through a display to allow the users to more intuitively use the contents. Accordingly, users can use the contents according to their individual taste through manipulation of the terminals.

Since the terminals according to the related art are manufactured in the form of a fixed size, it is preferable that the sizes of the displays are reduced to maximize portability, but it is also preferable to increase the size of the displays to enhance utilization of the contents. As a result, technologies for increasing portability while increasing the sizes of the displays have been developed, and terminals employing displays which can be deflected or folded are now being provided. Accordingly, it is becoming easier to preserve or manage terminals than before. However, the deflectable displays do not have special functions for users yet, except for the characteristics by which they can be simply deflected. Accordingly, various functions for the convenience of users, or for satisfying the requirements of users, need to be realized.

Therefore, a need remains for a method and apparatus for controlling to adaptively change an output of a screen of a flexible display.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of controlling an output of a screen of a flexible display, such that an output of content can be properly controlled for the convenience of users, or to allow users to manipulate a terminal more easily through the flexible display, which can be deflected or folded, and a terminal supporting the same.

In accordance with an aspect of the present invention, a terminal supporting control of an output of a screen of a flexible display is provided. The terminal includes a flexible display configured such that at least a portion of the flexible display is deflected or folded, a sensor unit for collecting a sensor signal for detecting a location where the flexible display is deflected or folded, and a controller for controlling to determine a specific area of a functional screen or at least one functional screen from among a plurality of functional screens which are output before the flexible display is deflected or folded, as a content viewing area, when an input event is received, and for outputting the determined content viewing area in a specific display area of the folded flexible display.

In accordance with another aspect of the present invention, a method of controlling an output of a screen of a flexible display is provided. The method includes as an input event is received, determining a specific area of a functional screen output on a flexible display or at least one functional screen from among a plurality of functional screens as a content viewing area, identifying deflection or folding of the flexible display, and outputting the area of the functional screen which has been determined as the content viewing area, or the at least one functional screen from among a plurality of functional screens in a predetermined area of the deflected or folded flexible display.

In accordance with still another aspect of the present invention, a method of controlling an output of a screen of a flexible display is provided. The method includes determining a specific area of a functional screen output in the flexible display or at least one functional screen from among a plurality of functional screens as a content viewing area as an input event is received, collecting a sensor signal according to a rolling of the flexible display, and moving the area selected as the content viewing area in a display area according to the rolling of the flexible display to display the moved area.

As described above, according to the method of controlling an output of a screen of a flexible display and the terminal supporting the same, a user can be allowed to use contents more easily by adaptively changing at least one functional screen which is output as the flexible display is deflected or folded.

Further, the present invention can allow main content areas to be output in a specific display area as a flexible display is deflected or folded according to requirements of a user, and thus allow the user to continuously view the contents.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
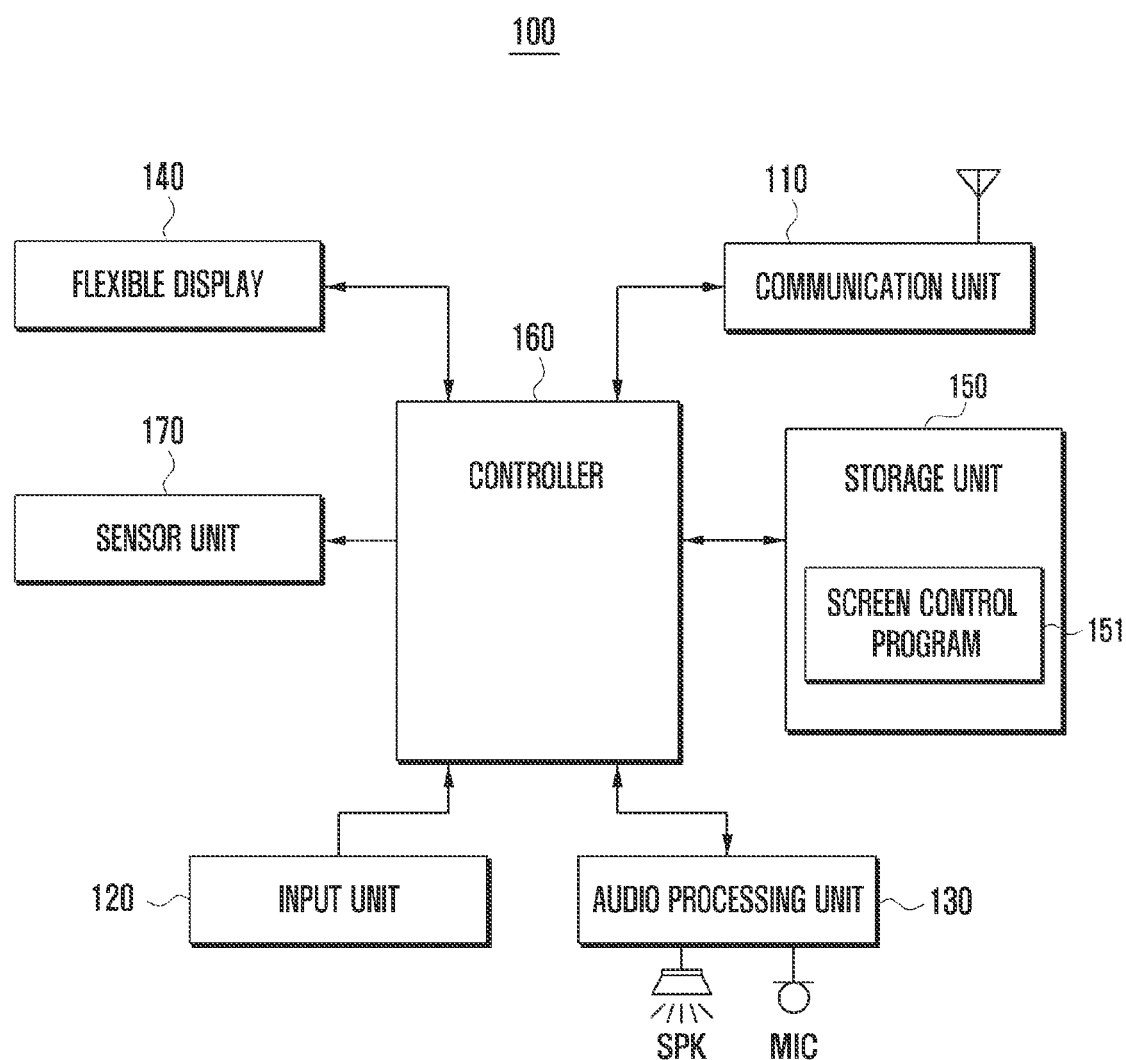
FIG. 1 is a block diagram illustrating a configuration of a terminal supporting control of an output of a screen of a flexible display according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of exemplary embodiments of the present invention, technical contents which are well known in the art and are not directly related to the present invention may be omitted. Further, a detailed description of constituent elements having substantially the same configurations and functions may be omitted.

Likewise, some elements may be exaggerated, omitted or schematically shown in the drawings, and the sizes of the elements may not reflect the actual sizes thereof Thus, the present invention is not limited by the relative sizes or intervals shown in the drawings.

FIG. 1 is a block diagram illustrating a configuration of a terminal supporting control of an output of a screen of a flexible display according to an exemplary embodiment of the present invention.

Referring to FIG. 1, the terminal 100 may include a communication unit 110, an input unit 120, an audio processing unit 130, a flexible display 140, a storage unit 150, a sensor unit 170, and a controller 160.

According to the above-configured terminal 100, when the flexible display 140 is deflected or folded by an external pressure, the sensor unit 170 may detect it and recognize the deflected or folded state of the flexible display 140. Further, when the flexible display 140 is deflected or folded, the terminal 100 may adjust a screen output state that is output on the flexible display 140 in response. Then, the terminal 100 may allow a content viewing area selected according to a specific condition, such as a content viewing history or a content selecting history, to be displayed in a specific display area of the deflected or folded area. That is, even when the size of a display area of the flexible display 140 is changed, for example, due to folding, the terminal 100 allows a content viewing area, which is to be identified by a user, to be continuously and automatically displayed on the display area whose size has been changed.

The communication unit 110 is configured to support a communication function of the terminal 100. When the terminal 100 is designed not to separately support a communication function, the communication unit 110 may be omitted according to the intention of the designer. In exemplary embodiments, the communication unit 110 may form a communication channel through which various contents output to the flexible display 140 can be received from the outside. After being stored in the storage unit 150, the contents received by the communication unit 110 may be output to the flexible display 140 in response to a request of the user. Further, the contents received by the communication unit 110 may be received and output to the flexible display 140 at the same time. The contents received by the communication unit 110 may be, for example, various files such as document files, picture files, photograph files, music files, or the like.

The input unit 120 is configured to support creation of an input signal of the terminal 100. The input unit 120 may be provided in various forms such as button keys, home keys, side keys, or the like, or in the form of a keypad. The input unit 120 may include a configuration of a touch screen including a touch panel and a display panel in an aspect of generating an input signal of the terminal 100. The input unit 120 may generate an input signal for requesting activation of at least one user function stored in the storage unit 150, and an input signal requesting output of a specific server page provided by a web server unit. While a specific function screen is output on the flexible display 140, the input unit 120 may generate an input signal for selecting a content viewing area of a function screen. The content viewing area may be an area which is desired to be continuously maintained in a specific area of the flexible display 140 by the user, and may be defined by a specific template unit or a predefined area unit. At least one area may be selected from the content viewing area of the function screen in response to a plurality of input signals generated by the input unit 120 or to a continuous input signal designating a specific area. The selection of the content viewing area will be described below in more detail with reference to the accompanying drawings.

The audio processing unit 130 is configured to support audio signal processing of the terminal 100, and may include a configuration of a speaker (SPK) for outputting an audio signal, and may further include a configuration including a microphone for collecting an audio signal. The audio processing unit 130 reproduces and outputs an audio signal contained in data for realizing a user function when a specific function is activated. In exemplary embodiments, the audio processing unit 130 may output various sound effects or guide sounds related to an operation of the flexible display unit 140. For example, when the flexible display 140 is deflected or folded, the audio processing unit 130 may output a sound effect in response to the deflection or folding of the flexible display 140. When a specific content viewing area is selected from a display area in the process of deflection or folding the flexible display 140, the audio processing unit 130 may output a guide sound corresponding to the selected content viewing area or regarding a description of the content viewing area. The above-described functions of the audio processing unit 130, such as an output of a guide sound or a sound effect, may be omitted according to the setting of the user or the intention of the designer.

The flexible display 140 is a display unit designed to be deflected or folded, and may output a specific functional screen under the control of the controller 160. The flexible display 140 may be deflected or folded into a part by an external pressure, and accordingly, at least one area of the flexible display 140 may be disposed to deviate from a view area of the user. For example, when it is assumed that the flexible display 140 is deflected or folded with respect to a center line thereof, a screen corresponding to half the original screen may be disposed in the view range of the user. When the flexible display 140 is deflected or folded at a predetermined angle or more as described above, only a specific display area with respect to a deflected or folded border point is driven and a separate screen output is not supported in the remaining areas. As a result, when a functional screen is output, the flexible display 140 may output the functional screen only in a specific display area when the flexible display 140 is deflected or folded. Then, the flexible display 140 may output only one area of the entire functional screen displayed previously in the corresponding display area, and in particular, may provide support to output an area selected as a content viewing area by the user in the corresponding display area. Accordingly, even when the flexible display 140 is deflected or folded due to various environmental factors or a specific purpose in the processing of viewing the flexible display 140 by the user, the flexible display 140 may provide support to continuously view the content viewing area which has been viewed by the user. A change of the content viewing area related to the flexible display 140 will be described in more detail with reference to the accompanying drawings.

The storage unit 150 is configured to store various programs and data related to driving of the terminal 100. For example, the storage unit 150 may store an operating system for operating the terminal 100, and may store a program for activating various functions displayed on the flexible display 140. In particular, the storage unit 150 may store a screen control program 151 for selecting a content viewing area and maintaining an output.

The screen control program 151 may include an identifying routine for identifying deflection and folding of the flexible display 140, a routine for collecting a display area and a content viewing area of the flexible display 140 selected by the identifying routine, and a routine for performing a control to display a content viewing area in the display area based on the collected information. The screen control program may further include a routine for detecting a release of the deflection or folding of the flexible display 140 when the deflection or folding of the flexible display 140 is released, and a routine for adjusting functional screens, which will be displayed on the flexible display 140 in response to detection of the release.

The sensor 170 is a sensor for detecting deflection or folding of the flexible display 140. The sensor unit 170 may be disposed at at least one side of the flexible display 140 to identify a deflected or folded area of the flexible display 140. To achieve this, the sensor unit 170 may include at least one of a tension sensor, a pressure sensor, and a piezoelectric sensor. The sensor unit 170 may collect a signal for a deflected or folded area of the flexible display 140 and transfer the collected information to the controller 160. The sensor signal provided by the sensor unit 170 provides information on a deflected or folded location of the flexible display 140 and information on a deflection or folding angle. For example, the tension sensor may be disposed at one side of the flexible display 140 to sense a change in tension due to the deflection of the flexible display 140. Then, the tension sensor may detect an increase or decrease value of the tension due to the deflection direction and transfer the value to the controller 160. A pressure sensor or the piezoelectric sensor may be disposed at a deflected or folded location of the flexible display 140 to detect a pressure change due to the deflection or folding or an electric change due to the pressure change and transfer the transformed value to the controller 160. Here, a plurality of sensors may be uniformly disposed at predetermined locations of the flexible display 140 to collect information on the deflected or folded location of the flexible display 140, and transfer ID values thereof to the controller 160 when sensor signals are collected, to allow the controller 160 to identify from which sensors the sensor signals are received. The sensor unit 170 may be disposed at a certain inner point of the flexible display 140, for example, at a center thereof or a portion adjacent to the center thereof, as well as at a periphery of the flexible display 140, to recognize various deflections or foldings of the flexible display 140. A sensor unit 170 disposed at a central portion of the flexible display 140 may be disposed on a rear surface of the flexible display 140 to prevent a display function from being hindered.

The controller 160 supports various signal processing, data processing, and data transmissions related to driving of the terminal 100. In particular, the controller 160 may support various controls for displaying a content viewing area of the flexible display 140. To this end, the controller 160 may have a configuration shown in FIG. 2.

Figure 2:
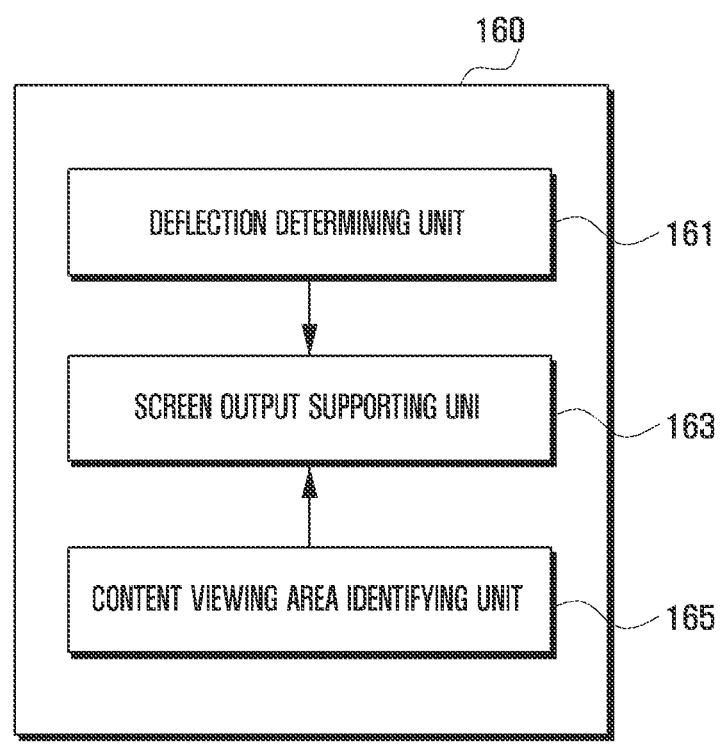
FIG. 2 is a block diagram illustrating a configuration of a controller of FIG. 1 in more detail according to an exemplary embodiment of the present invention.

FIG. 2 is a block diagram illustrating a configuration of the controller of FIG. 1 in more detail according to an exemplary embodiment of the present invention.

Referring to FIG. 2, the controller 160 may include a deflection determining unit 161, a content viewing area identifying unit 165, and a screen output supporting unit 163.

The deflection determining unit 161 is configured to determine deflection or folding of the flexible display 140. The deflection determining unit 161 may compare a sensor signal transferred from the sensor unit 170 with predefined reference data to determine that the flexible display 140 is deflected or folded when the sensor signal corresponds to a value of the reference data or more. In particular, the deflection determining unit 161 may prepare a reference table for increased or decreased values of the tension, for changed values in pressure, and for changed electric values due to pressure provided by the sensor unit 170 in advance, and may determine to which degree the flexible display 140 is deflected or folded based on the reference table. The reference table is a table in which a change value in the sensor signal due to the deflection or folding of the flexible display 140 is recorded, and may be provided through experimental and statistical procedures for various flexible displays 140. When the flexible display 140 is deflected at a predefined angle or more, the deflection determining unit 161 transfers information on the deflection or folding or a folded location value of the flexible display 140 to the screen output supporting unit 163.

The contents viewing area identifying unit 165 is configured to collect information on the area selected by the user before the flexible display 140 is folded. When a predefined input event for selecting a specific area of the flexible display 140 or a specific area including the functional screens output to the flexible display 140 is generated, the content viewing area identifying unit 165 identifies a content viewing area with reference to a point where the input event is generated. Further, the content viewing area identifying unit 165 may transfer location information on the collected content viewing area to the screen output supporting unit 163.

The screen output supporting unit 163 identifies that the flexible display 140 is deflected or folded at a predefined angle or more based on a sensor signal received from the deflection determining unit 161. If it is identified that the flexible display 140 is deflected or folded at a predetermined angle or more, the screen output supporting unit 163 may identify location information of the received sensor signal to identify which portion of the flexible display 140 is deflected or folded.

In exemplary embodiments, if the deflection or folding of the flexible display 140 is identified, the screen output supporting unit 163 may identify the content viewing area location information transferred from the content viewing area identifying unit 165. Further, the screen output supporting unit 163 may determine an area corresponding to the content viewing area location information as a display area, and may provide support to output the content viewing area in the display area. In the process, the screen output supporting unit 163 may provide support to output a predetermined range of the screen determined as a content viewing area in the folded display area, and when the size of the display area is smaller or larger than the size of the content viewing area, may provide support to resize the content viewing area such that the size of the content viewing area becomes smaller or larger in response. Then, the screen output supporting unit 163 provides support to change the direction of the corresponding screen if necessary or according to the characteristics of the selected content viewing area. The content viewing area may be a certain area predefined with respect to a point selected by a user or specific functional screens of a plurality of disposed functional screens.

In exemplary embodiments, the screen output supporting unit 163 identifies the size of the screen determined as a content viewing area, and provides support to resize the corresponding screens such that the screens correspond to the folded display area. When a plurality of functional screens are selected as a content viewing area, the screen output supporting unit 163 may provide support to resize the functional screens according to a predefined ratio. Alternatively, the screen output supporting unit 163 may apply resizing ratios of the functional screens differently according to a form or order of the input event for designating the functional screens as a content viewing area.

For example, a ratio of the functional screen selected first may be allocated to a higher value according to a selection order in which a plurality of functional screens are selected as the content viewing area, and then the ratio of the selected functional screen may be allocated to a lower value. Alternatively, the screen output support unit 163 may apply the resizing screen ratio differently according to the types of the functional screens selected as a content viewing area. For example, the screen output supporting unit 163 may maintain the size of an image screen at a previous screen size while the display area is changed due to the folding of the flexible display 140, and may adjust the size of another functional screen to output the functional area in a display area other than the image screen. Alternatively, the screen output supporting unit 163 may maintain or adjust the size of a text screen such that the text screen has a minimum size for recognition of a letter, for example, a specific size preset by the user, and may provide support to adjust and output a size of another functional screen and output the size in an area where a specific text screen is not displayed.

Figure 3:
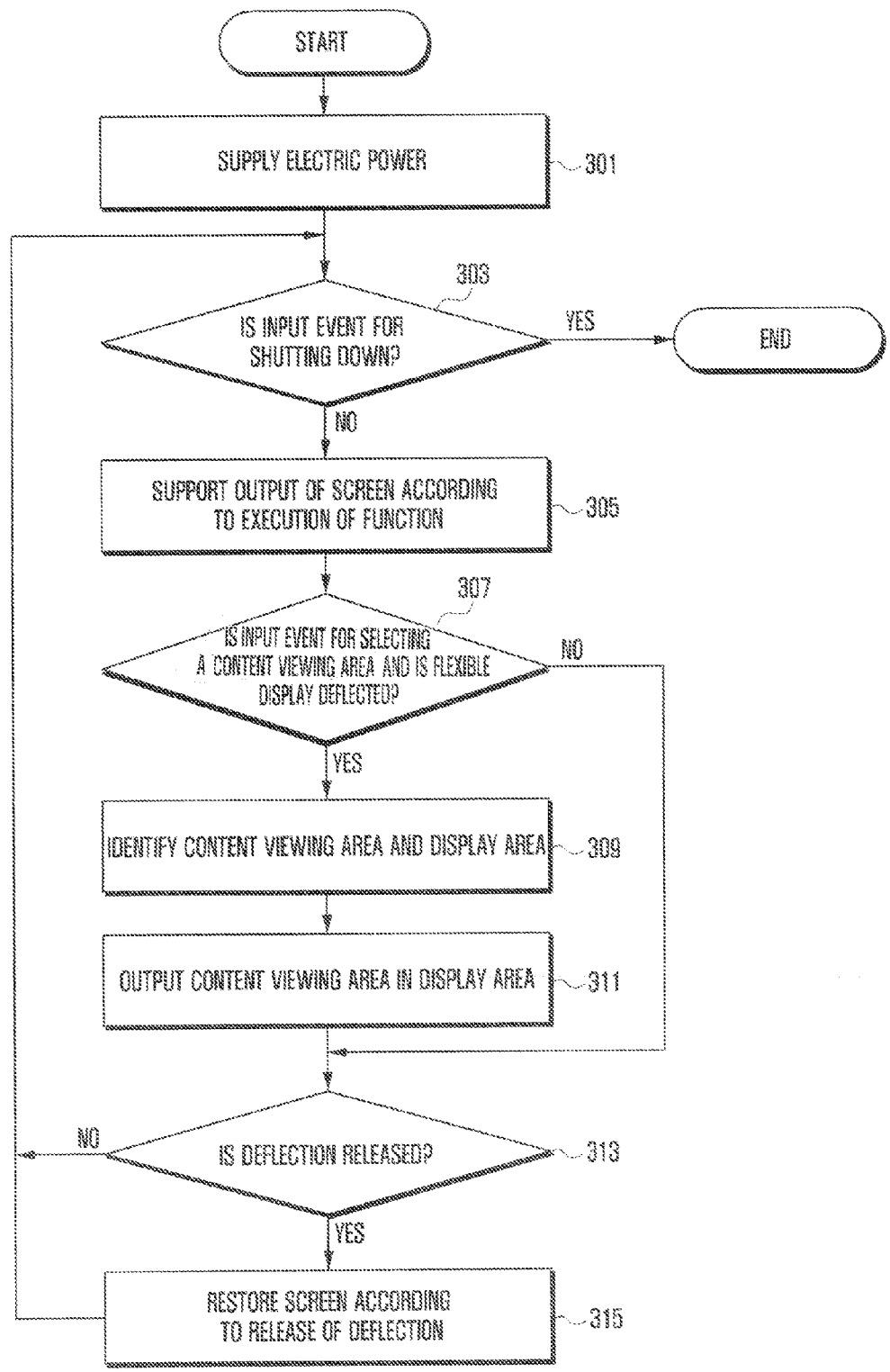
FIG. 3 is a view for explaining a method of controlling a screen output of a flexible display according to an exemplary embodiment of the present invention.

FIG. 3 is a view for explaining a method of controlling a screen output of a flexible display according to an exemplary embodiment of the present invention.

Referring to FIG. 3, first, the method of controlling a screen output according to an exemplary embodiment of the present invention provides a step 301 of supplying electric power of a power source to elements of the terminal 100 by the controller 160. In particular, the control unit 160 may support supply of electric power to the flexible display 140 and supply of electric power to the sensor unit 170 for determining deflection or folding of the flexible display 140 to control an output of the contents of the flexible display 140. Here, when the basic elements related to driving of the terminal 100 are designed to support a communication function, the controller 160 may supply electric power for detecting an input signal generated in the input unit 120 while supporting supply of electric power to the communication unit 110.

If a specific input event is generated in step 303, the controller 160 identifies whether the corresponding input event is an input event for shutting down. When an input event for shutting down is generated in the process, the controller 160 may progress a procedure for shutting down the terminal 100. In exemplary embodiments, when the input event is an input event for executing a specific function, the controller 160 may branch out to step 305 to execute a function corresponding to an input event, and may output a screen according to the execution of a function to the flexible display 140.

Next, if an input event is generated, the controller 160 identifies whether the event is an input event for selecting a content viewing area in step 307, and also identifies a deflection of the flexible display 140. In this step, when the flexible display 140 is deflected, the controller 160 is branched out to step 309 to identify a content viewing area and a display area due to the collected input event. That is, the controller 160 identifies a sensor signal transferred from the sensor unit 170, and if a sensor signal having a predetermined magnitude or larger is generated, determines a deflection of the flexible display 140 and may identify a content viewing area designated by the input event, and a display area due to the input event.

Thereafter, the controller 160 is branched out to step 311 to output at least one functional screen selected as a content viewing area or at least a portion of the functional area in the display area. In this process, as described above, the controller 160 may resize at least one functional screen selected as a content viewing area or at least a portion of the functional area such that the functional screen corresponds to the size of the display area.

Next, the controller 160 identifies whether an event for releasing the deflection is generated in step 313. In this step, if an event for releasing a deflection is generated, the controller 160 branches out to step 315 to support restoration of a screen due to the release of the deflection. That is, the controller 160 recognizes generation of release of the deflection or folding of the flexible display 140 according to a change in a specific sensor signal value transferred from the sensor unit 170. The controller 160 provides support to return to a screen output state before generation of the deflection or folding when the deflection or folding of the flexible display 140 is released, or resizes a content viewing area currently display as the size of the display area expands.

For example, it is assumed that two functional screens are output in a display area where two functional screens are selected as a content viewing area whereby the display area becomes smaller in a situation in which three functional screens are displayed before generation of a deflection. In this case, the controller 160 may provide support to return to the previous three functional screen output state according to a predefined setting when the deflection or folding is released or to expand the sizes of the two functional screens selected as the content viewing area to display the two functional screens in a display area where three functional screens are output. In this process, the controller 160 may provide support to resize the two functional screens selected as the content viewing area to output the two functional screens on the previous screen.

In exemplary embodiments, when there is no deflection of the flexible display in step 307, step 309 and step 311 may be skipped, and when there is no event for releasing a deflection in step 313, the step may be branched out to step 303 to provide support to perform the following processes again. In addition, after step 315, the controller 160 is branched out to step 303 to support performance of the functions according to the following input events.

As described above, in the terminal 100 supporting control of an output of contents due to deflection or folding of the flexible display 140 and the method of operating the terminal according to exemplary embodiments of the present invention, a content area may be automatically output in a specific display area as the flexible display 140 is deflected or folded. Accordingly, exemplary embodiments of the present invention can allow a user to continuously view contents without adjusting the size of the corresponding content area or moving the content area.

Figure 4:
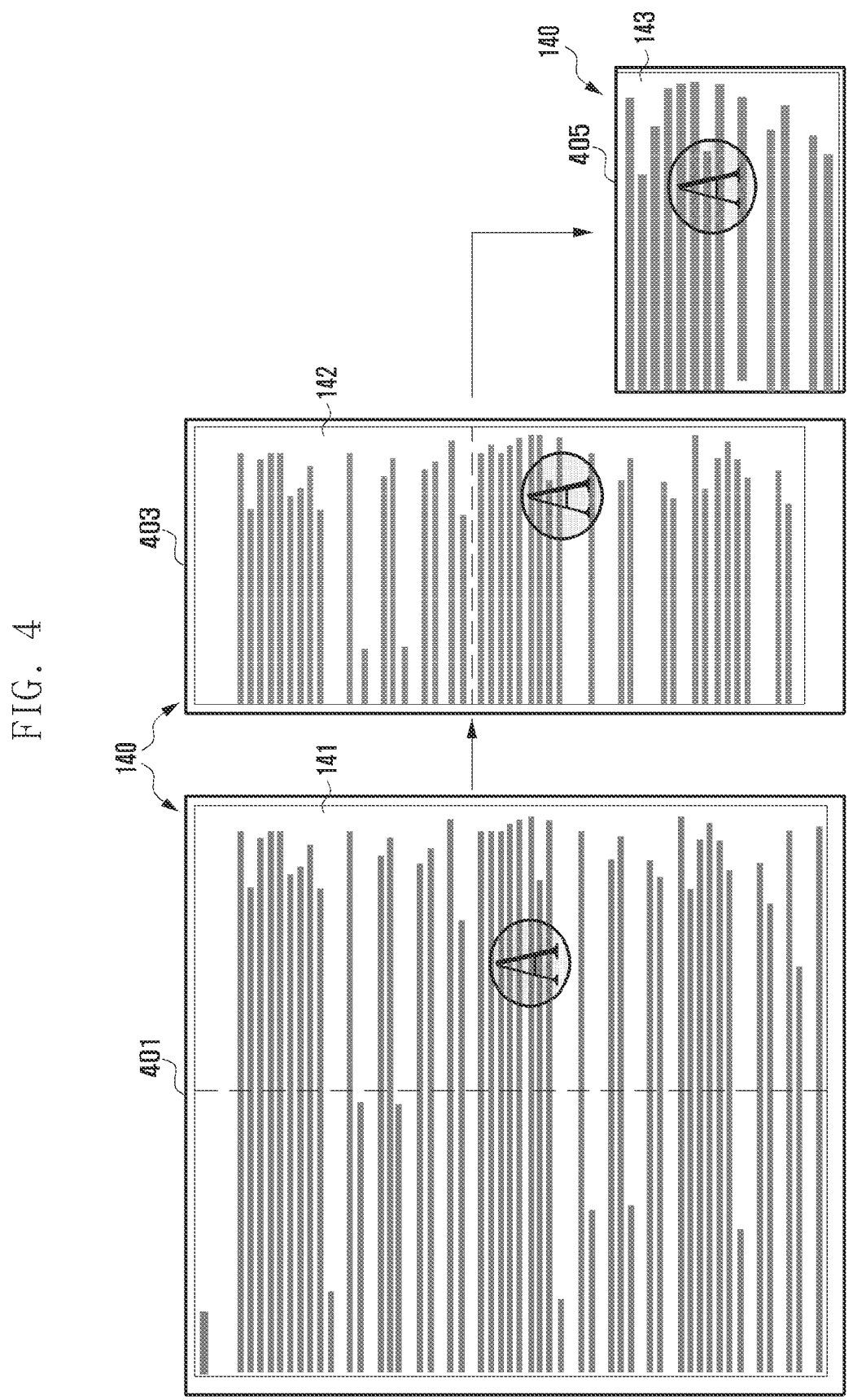
FIG. 4 shows views of a screen for explaining a change of a content viewing area due to deflection or folding of the flexible display according to an exemplary embodiment of the present invention.

FIG. 4 shows views of a screen for explaining a change of a content viewing area due to deflection or folding of the flexible display according to an exemplary embodiment of the present invention.

Referring to FIG. 4, the terminal 100 outputs a specific content, for example, a text content in a certain area of the flexible display 140 as in screen 401 according to generation of an input event. In particular, the terminal 100 may output a text content in an entire area 141 of the flexible display 140. The text functional screen shown in screen 401 exemplifies that the flexible display 140 may be deflected or folded.

In exemplary embodiments, when the user folds the flexible display 140 at a predetermined angle or more, the terminal 100 may output only a portion of the text content in a first display area 142 as in screen 403. Here, the first display area 142 may be an area selected according to a predetermined condition while a portion of the entire area 141 is folded. For example, when the user selects an area "A" as a content viewing area from screen 401, the terminal 100 may designate the first display area 142 as an area of the flexible display 140 where the area "A" is located. If the first display area 142 is selected as the entire area 141 is folded longitudinally, the terminal 100 outputs a text content corresponding to a longitudinal half of some of the text content, for example, the text content output in the entire area 141 as a content viewing area.

In exemplary embodiments, when the flexible display 140 is transversely folded by a predetermined size after the user selects the area "A" of the first display area 142 of the flexible display 140 in the state of screen 403, the terminal 100 may output the text content as in screen 405 in the second display area 143 corresponding to the selected area "A". In this process, the terminal 100 may output the text content output in the selected "A" area of the text content output in the first display area 142 in the second display area 143.

In the process of changing the output of the text content, the terminal 100 may determine the sizes of the first display area 142 and the second display area 143 based on location information in the flexible display 140, which is designated by the user, and a border area determined according to the folding of the flexible display 140. Although it has been described in the detailed description of the terminal 100 that the text content is eliminated according to a reduction of the display area, exemplary embodiments of the present invention are not limited thereto. That is, the terminal 100 may output the changed display area while resizing the size of the text content. Then, the terminal 100 may output a text of a predetermined size corresponding to the size of the folded display area, and may exclude some of the text content when the text should be reduced to a predetermined size or less. Then, the terminal 100 may determine some of the text content having an area larger than the remaining display area, which should be excluded, while adjusting the input event for selecting a content viewing area such that the input event is located at a center of the changed display area.

Figure 5:
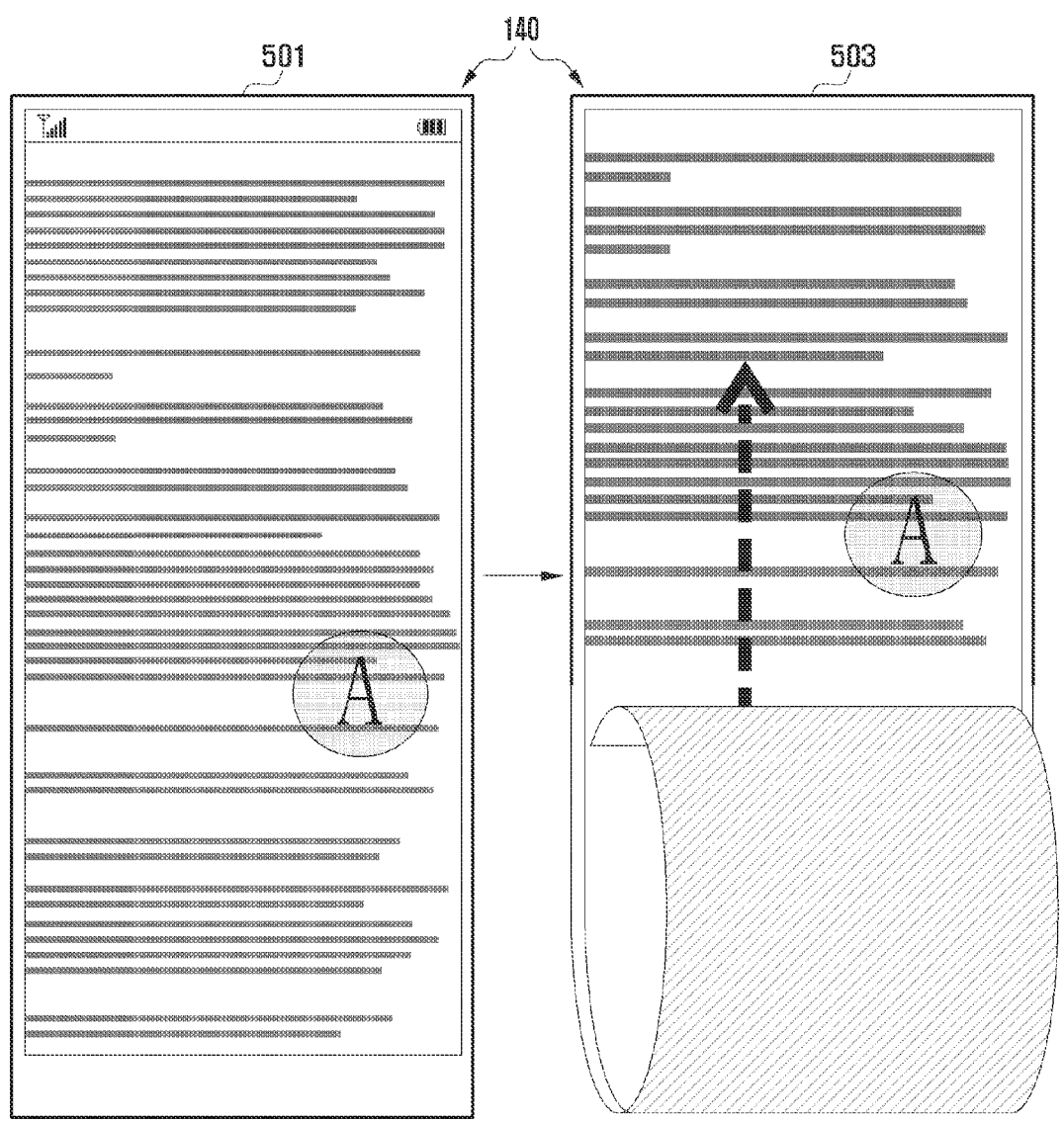
FIG. 5 shows views for explaining a change of a content viewing area due to rolling of the flexible display according to an exemplary embodiment of the present invention.

FIG. 5 shows views for explaining a change of a content viewing area due to rolling of the flexible display according to an exemplary embodiment of the present invention.

Referring to FIG. 5, the terminal 100 may output a specific content on the flexible display 140 as in screen 601 according to generation of an input event. In this process, if a sensor signal corresponding to the rolling of the flexible display 140 as in screen 503 is collected after an input event is generated according to selection of a content viewing area, for example, an "A" area, the terminal 100 may change the content viewing area according to the rolling of the flexible display 140. That is, as shown, the terminal 100 may output the content viewing area in an uncovered area while the flexible display 140 is rolled. Accordingly, when the flexible display 140 is continuously rolled, the content viewing area is moved in the same direction as the direction in which the flexible display 140 is rolled to allow the user to identify the corresponding content. In such case, the movement speed of the content viewing area may be proportional to a speed at which the flexible display 140 is rolled.

The terminal 100 may analyze various sensor signals transferred from the sensor unit 170, and may determine in which form the flexible display 140 is rolled. For example, the terminal 100 provides a contact sensor at a periphery of the flexible display 140, and if a sensor signal is selected from the contact sensor due to the rolling of the flexible display 140, may determine in which form the flexible display 140 is rolled and controls such that a content viewing area is displayed in a display area other than a portion covered due to the folding of the flexible display 140.

Figure 6:
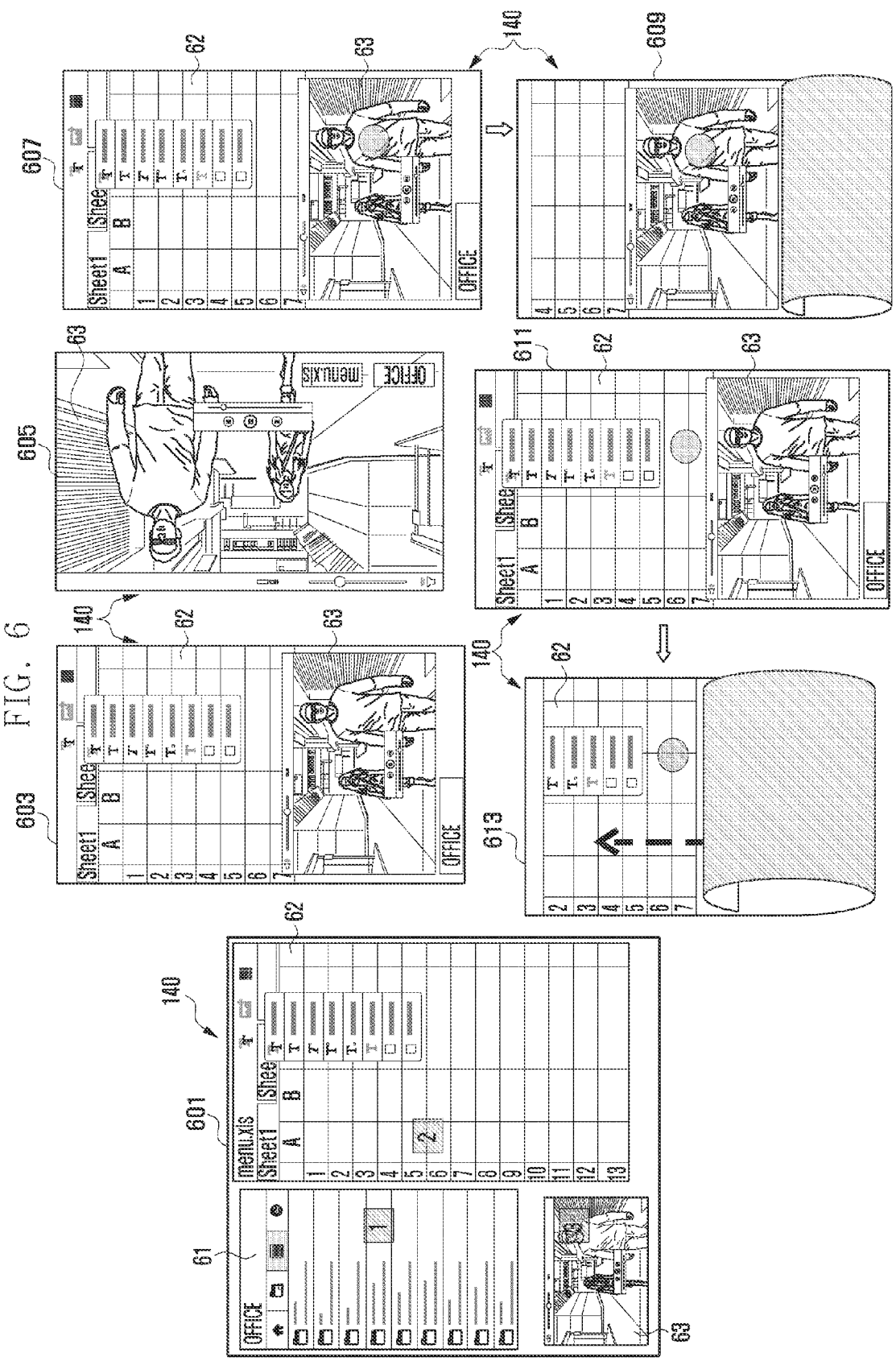
FIG. 6 shows views for explaining a change of a content viewing area due to deflection or folding of the flexible display according to an exemplary embodiment of the present invention.

FIG. 6 shows views for explaining a change of a content viewing area due to deflection or folding of the flexible display according to an exemplary embodiment of the present invention based on a multitasking function.

Referring to FIG. 6, the terminal 100 may output a plurality of functional screens on the flexible display 140 as in screen 601 according to generation of an input event. To this end, the user may generate an input event for activating a user function corresponding to various shown functional screens. Then, the terminal 100 may divide the screen while outputting the screen of the user functions selected by the user into screens, and output a screen for performance of an activated function in the divided screens. Screen 601 shows a screen according to performance of three or more user functions on the flexible display 140 corresponding to a state in which an output is required. For convenience' sake, it will be exemplified in screen 601 that the flexible display 140 outputs a first functional screen 61, a second functional screen 62, and a third functional screen 63.

In exemplary embodiments, while screen 601 is output, the user may generate an input event for selecting functional screens from among the plurality of functional screens, which are selected as a content viewing area. For example, the user may generate an input event for selecting the second functional screen 62 and the third functional screen 63 as a content viewing area, and when an area of the flexible display 140 is folded, the terminal 100 may output the second functional screen 62 and the third functional screen 63 selected as a content viewing area in a folding area as in screen 603. Then, the display area remaining due to the folding of the flexible display 140 may be an area of a location where an input event for selecting a content viewing area is generated. Further, the terminal 100 may not support an output of separate data in an area which is not selected as a content viewing area, that is, an area where the first functional screen 61 has been output. Alternatively, the terminal 100 may interrupt a supply of electric power to the unselected area. Also, the user function corresponding to the first functional screen 61 may be temporarily paused or automatically terminated.

In exemplary embodiments, when the flexible display 140 is folded after a third functional screen 63 is selected as a content viewing area in screen 601, the terminal 100 may output the third functional screen 63 in the display area of the flexible display 140 in which the flexible display 140 is folded. For example, when the flexible display 140 is folded along a lengthwise direction thereof, the terminal 100 may output the third functional screen 63 in the display area selected by the folding. Here, the terminal 100 may support resizing and change an output direction as in screen 605 while outputting the third functional screen 63 in the display area. The drawing shows that the third functional screen 63 is changed to be output not transversely but longitudinally, and also shows that the third functional screen 63 is rotated by 270 degrees or −90 degrees to be output.

In order to select a display area, the user generates an input event for selecting a content viewing area and folds the flexible display 140, in which case generation of an input event may be ended at a location of the second functional screen 62 in screen 601 while the second functional screen 62 and the third functional screen 63 are simultaneously selected. Further, if the user folds a left area with respect to a central imaginary longitudinal line of the flexible display 140, the second functional screen 62 and the third functional screen 63 may be output in a right area. To the contrary, since the third functional screen 63 is initially located on the left side of a central imaginary longitudinal line of the third functional screen 63 in the case of an input event in which only the third functional screen 63 is selected, the input event is also generated in the left area. Accordingly, when the user folds a right area with respect to the imaginary longitudinal line of the central area of the flexible display 140, the terminal 100 may output the third functional screen 63 on the left area.

Although it has been described that the flexible display 140 is folded with respect to the central imaginary longitudinal line for convenience' sake, exemplary embodiments of the present invention are not limited thereto. That is, the user may fold the flexible display 140 longitudinally by a desired width, and accordingly, a display area where a point of an input event is located may be selected as a display area where the selected functional screens are output. As a result, the terminal 100 outputs a functional screen with respect to the location selected as a content viewing area, and may output the corresponding functional screen in the display area due to the folding. When the functional screen is required to be resized during an output thereof as described above, resizing of the screen or conversion of the direction of the screen may be supported and a function of partially excluding a content may be applied.

In screen 603, the flexible display 140 outputs the second functional screen 62 and the third functional screen 63 in the display area of the folded flexible display 140. Then, the user may additionally generate an input event for selecting the third functional screen 63 as a content viewing area as in screen 607. Thereafter, when one end of the flexible display 140 is rolled as in step 609, the terminal 100 allows the third functional screen 63 to be displayed after being moved toward the rolling direction such that the third functional screen 63 deviates from an area covered due to the rolling as shown. Then, as shown, the third functional screen 63 may be moved while the second screen 62 is pushed upward. Further, the terminal 100 may display such that the third functional screen 63 is moved to an upper layer of the second functional screen 62 while the second functional screen 62 is fixed.

Further, when the user additionally selects the second functional screen 62 as a content viewing area as in screen 611 in the state of screen 603 and one end of the flexible display 140 is rolled as in step 613, the terminal 100 may control movement of an area of the second functional screen 62 such that the area of the second functional screen 62 corresponds to the rolled area regardless of the fact that the third functional screen 63 is covered by the rolled area of the flexible display 140. That is, if it is determined that the content viewing area of the second functional screen 62 is covered by the rolled area of the flexible display 140, the terminal 100 may move the content viewing area of the second functional screen 62.

Figure 7:
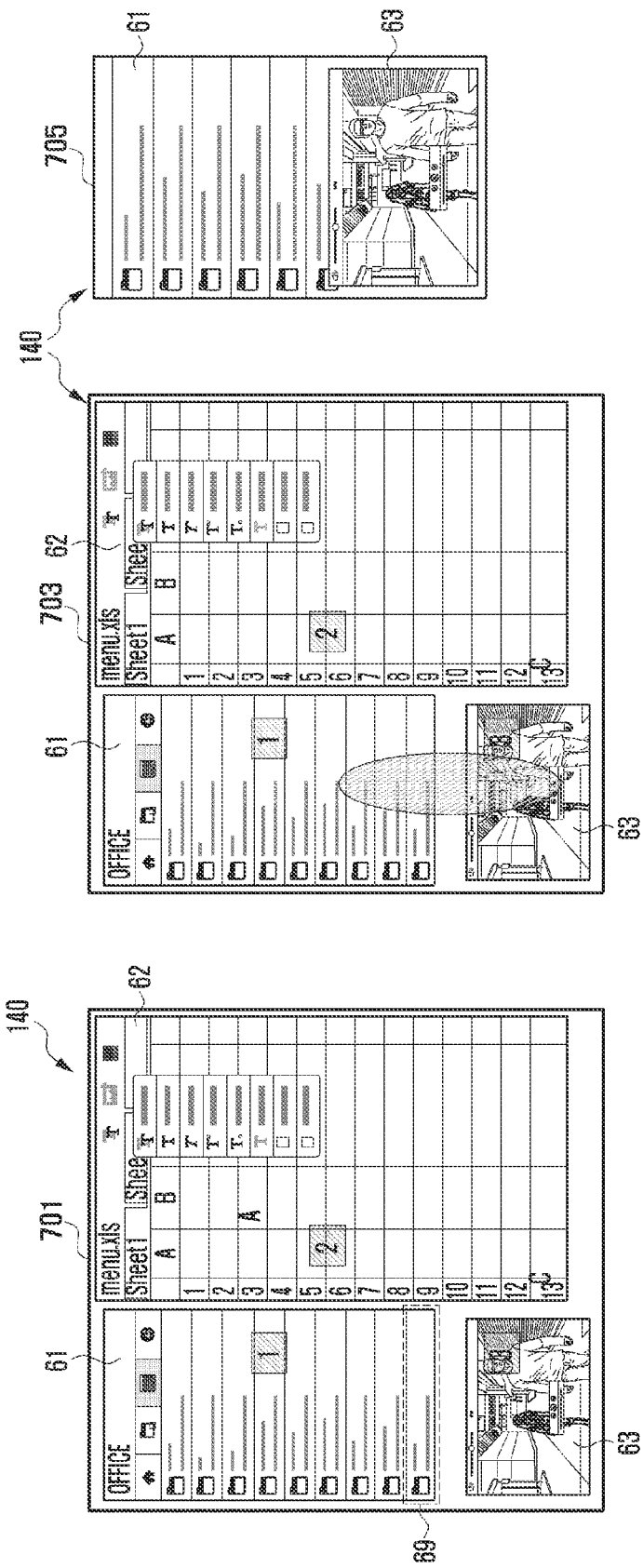
FIG. 7 shows views for explaining a change in a screen output of a flexible display which is folded in a multitasking environment according to an exemplary embodiment of the present invention.

FIG. 7 shows views for explaining a change in a screen output of a flexible display which is folded in a multitasking environment according to an exemplary embodiment of the present invention.

Referring to FIG. 7, as in the previous description of screen 601 of FIG. 6, the flexible display 140 outputs a first functional screen 61, a second functional screen 62, and a third functional screen 63 according to division of screens as in screen 701 in response to a request for execution of a complex function of the user. Here, the division ratio of the functional screens 61, 62, and 63 may be determined according to a predefined value or may be adjusted in response to a request of the user. For example, when the user increases the size of a specific functional screen after the functional screens 61, 62, and 63 are output, the size of the other functional screens may be reduced in response.

In exemplary embodiments, when the user folds the flexible display 140 after selecting the first functional screen 61 and the third functional screen 63 as a content viewing area as in screen 703, an output of the second functional screen 62 may be stopped and the first functional screen 61 and the third functional screen 63 may be output in a specific display area of the flexible display 140 as in screen 705.

The terminal 100 may not output the functional screens at location selected as a content viewing area when the flexible display 140 is folded, but may output the first functional screen 61 and the third functional screen 63 in a display area having a relatively larger area due to the folding. Further, the terminal 100 may differently designate the ranges of the functional screens, which are to be output in the display area according to selection of an area of an input event generated for selection of the functional screens. For example, if an input event including items displayed on the first functional screen 61 for selecting the third functional screen 63 is generated in screen 703, the terminal 100 may output only the items of the first functional screen 61 together with the third functional screen 63 when the functional screens are output in the display area selected due to the folding of the flexible display 140.

The terminal 100 may identify display characteristics of the first functional screen 61, and may identify the size of a specific element, for example, one or more template 69 of the screen whose areas can be classified. Accordingly, the terminal 100 may recognize the list items included in the first functional screen 61 as an individual template for each size, and may recognize the third functional screen 63 as one template. Further, the terminal 100 may output the areas including only the templates 69 selected by an input event in the display area of the flexible display 140 selected due to the folding. Here, screen 705 may correspond to a case where the flexible display 140 is folded a plurality of times, and may correspond to a state in which both the first functional screen 61 and the third functional screen 63 are output when the flexible display 140 is folded longitudinally. When the screen is output in a display area remaining after a plurality of foldings, for example, longitudinal folding and transverse folding, the terminal 100 may output only the areas of the templates 69 selected due to the above-described input event. Here, the template 69 may include various areas classified by dividing a screen. For example, in the first functional screen 61, the items of the list may be a sub-template or the list may be a large template.

The terminal 100 may not select a functional screen, which is to be output in the folded flexible display 140 in units of templates, but may determine the functional screen according to a generated touch event. That is, the terminal 100 identifies a drag event of a predetermined length from a lower end of the first functional screen 61 generated for selection of the first functional screen 61, and outputs an area of the first functional screen 61 corresponding to a size designated by the drag event, that is, corresponding to a starting point and an ending point of the drag event in the folded flexible display 140.

In exemplary embodiments, the functional screen which has not been selected as the content viewing area may be converted to a snapshot or a bookmark to be displayed in an area of the display area of the folded flexible display 140. Accordingly, the user may perform an operation of outputting the functional screen which has not been selected as the content viewing area in the display area of the folded flexible display 140. Then, the terminal 100 may rearrange the functional screens after the screen is divided again while the functional screen provided in the previous screen is output to the folded flexible display 140, or may replace a specific functional screen of the currently displayed functional screens with a newly selected functional screen to output the selected functional screen.

Figure 8:
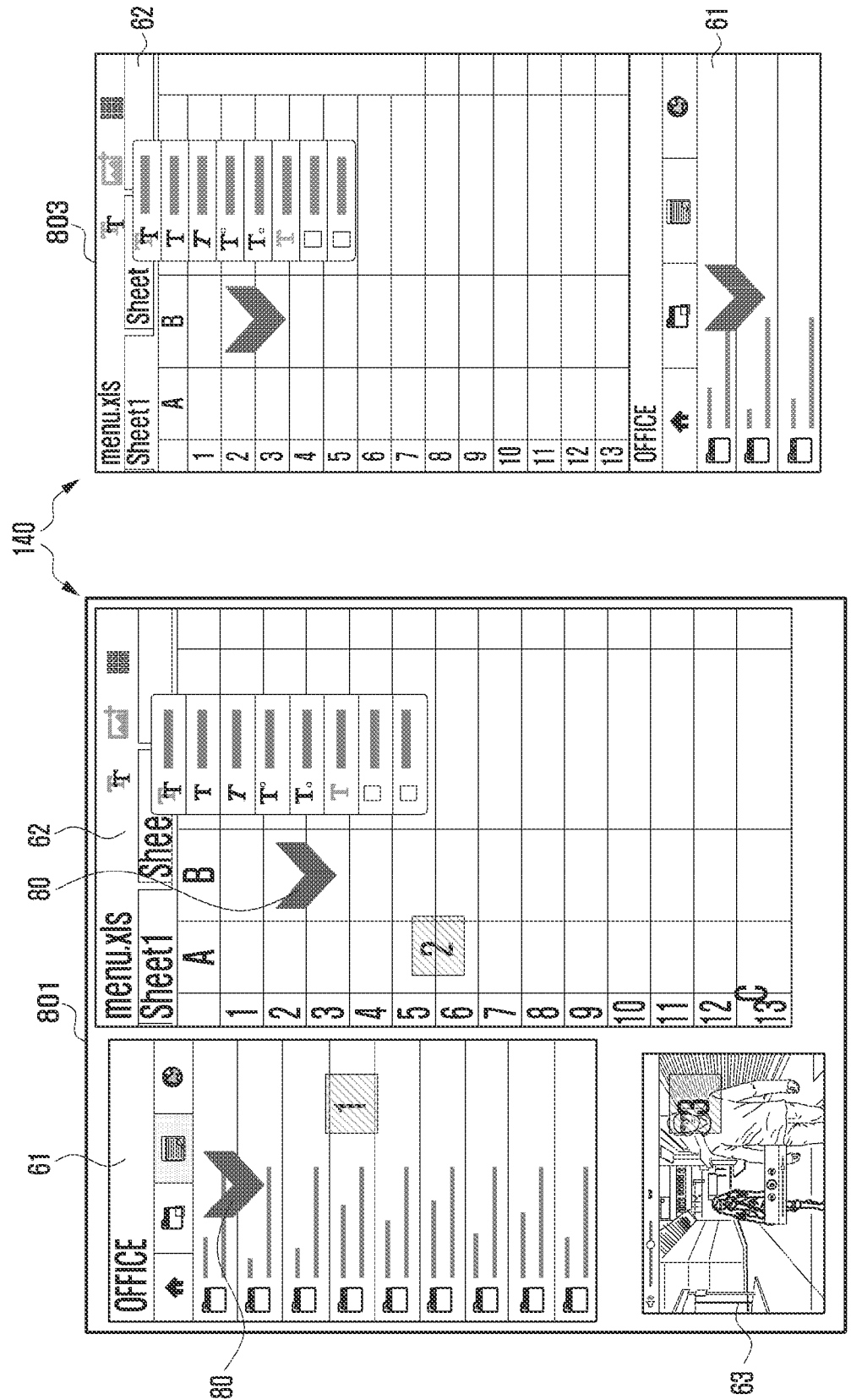
FIG. 8 shows views for explaining the selection of a content viewing area according to an exemplary embodiment of the present invention.

FIG. 8 shows views for explaining the selection of a content viewing area according to an exemplary embodiment of the present invention.

Referring to FIG. 8, the terminal 100 may output a plurality of functional screens 61, 62, ad 63 in the flexible display 140 according to generation of an input event through division of a screen as in screen 801. The user generates an input signal for operating a plurality of functional screens 61, 62, and 63 output in screen 801 and use a user function provided by the functional screens. In this process, the user may select at least one functional screen as a content viewing area. In exemplary embodiments, the user may perform an operation of generating a predefined gesture event 80 on an area where the functional screens are output as shown. Screen 801 exemplifies that the user generates a gesture event 80 having a point of inflection facing downward on an area where the first functional screen 61 and the second functional screen 62, for example, a "V"-shaped gesture event 80 is created.

After a gesture for selecting the first functional screen 61 and the second functional screen 62 is performed, the user provides support to output the first functional screen 61 and the second functional screen 62 in a display area of the folded flexible display 140, which may be selected according to a specific condition. In this process, the terminal 100 may locate the second functional screen 62 at an upper end of screen 803 and locate the first functional screen 61 at a lower end of the second functional screen 62. Alternatively, the terminal 100 may perform a control to locate the first functional screen 61 at an upper end of the second functional screen 62. For example, the terminal 100 may identify a screen occupancy ratio of the functional screens, which have been output in screen 801, may dispose of a functional screen having a relatively high screen occupancy ratio at an upper end of the screen, and may display a screen located at an upper end of the screen larger than the functional screen located at a lower end thereof That is, the terminal 100 may apply a resizing ratio according to a screen occupancy ratio of the functional screens differently from the screen before the flexible display 140 is folded. The terminal 100 may exclude some contents if necessary in the case of a functional screen disposed at a lower end of the screen to output the functional screen.

Figure 9:
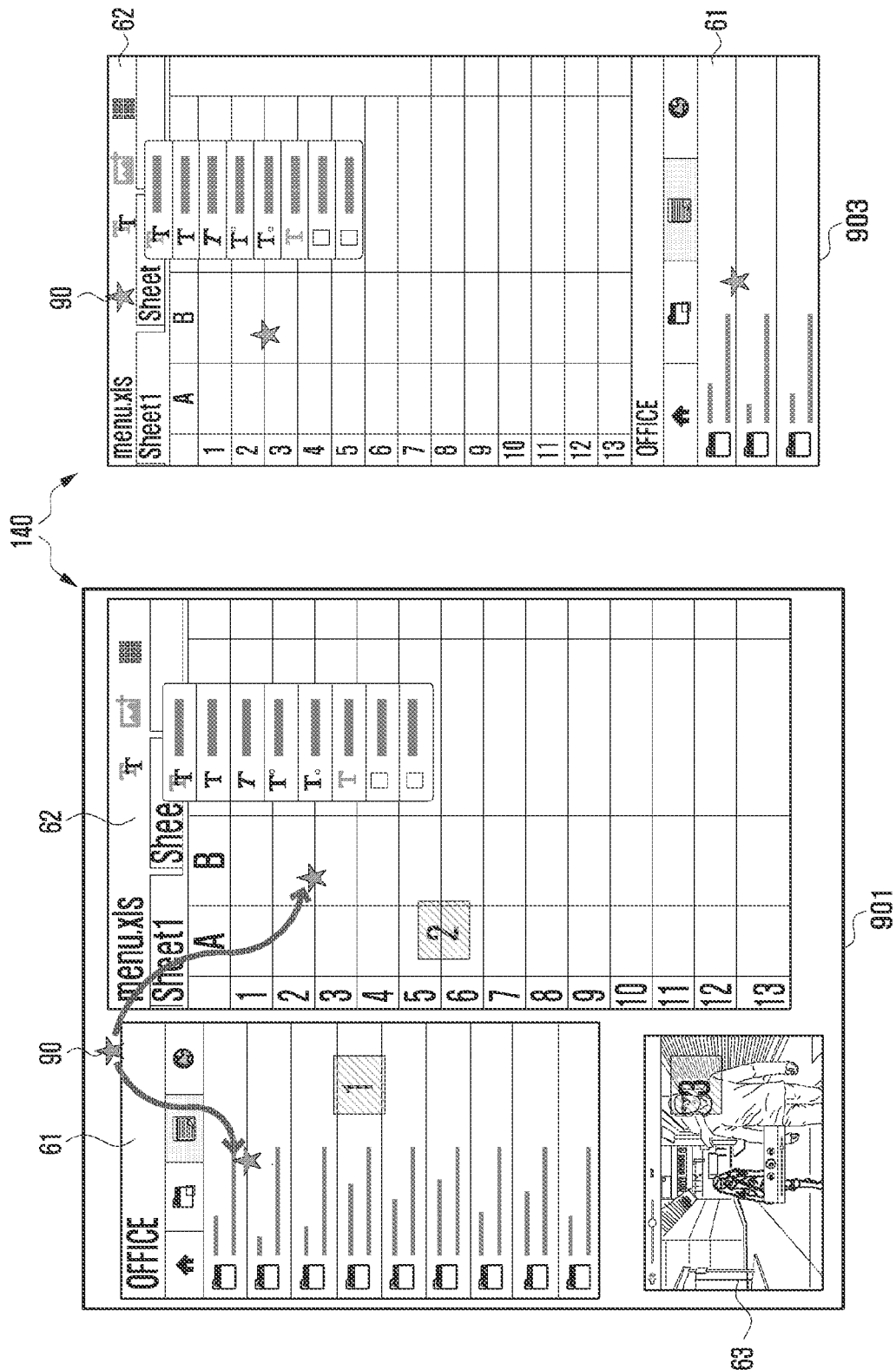
FIG. 9 shows views for explaining an input event for selecting at least one functional screen as a content viewing area in a multitasking environment area according to an exemplary embodiment of the present invention.

FIG. 9 shows views for explaining an input event for selecting at least one functional screen as a content viewing area in a multitasking environment according to an exemplary embodiment of the present invention.

Referring to FIG. 9, as a plurality of user functions designated by an input event are activated, the terminal 100 outputs three functional screens 61, 62, and 63 as shown in screen 901. In addition, the terminal 100 may dispose an imaginary sticker 90 by which at least one of the functional screens 61, 62, and 63 can be designated as a content viewing area at one side of the screen. The user may select a functional screen, which will be left in a display area reduced as the flexible display 140 is folded, from the functional screens 61, 62, and 63 by using the imaginary sticker 90. For example, the user may select and drag the imaginary sticker 90 to locate the dragged imaginary sticker on the first functional screen 61. Here, the terminal 100 may dispose imaginary stickers 90 corresponding to the number of the functional screens 61, 62, and 63 such that at least one of the plurality of functional screens 61, 62, and 63 is designated as a content viewing area, or newly generate the same imaginary sticker 90 at the previous location of the imaginary sticker 90 is moved. Then, the user may select specific functional screens of the plurality of functional screens 61, 62, and 63, for example, the first functional screen 61 and the second functional screen 62 as a content viewing screen through an operation of locating the imaginary sticker 90 on a specific functional screen after dragging the imaginary sticker 90.

Thereafter, when the flexible display 140 is folded as in screen 903, the terminal 100 may output the first functional screen 61 and the second functional screen 62 where the imaginary sticker 90 is located in a display area selected according to a specific condition. After the first functional screen 61 and the second functional screen 62 are output in the display area, the imaginary sticker 90 output on the screen may be removed for a functional operation. Further, the terminal 100 may provide an imaginary sticker 90 at one side of screen 903 to designate a screen for selecting a content viewing area in the process of folding the flexible display 140.

Although it has been described that a specific display area of the area of the flexible display 140 on which the content viewing area is displayed is determined as an input event generated on the display, exemplary embodiments of the present invention are not limited thereto. That is, the terminal 100 includes a gyro sensor or a gravity sensor in the sensor unit 170, and may identify an area of the folded areas of the flexible display 140, which is exposed to a user, based on a sensor signal received from the sensor. Further, although it has been described that an area of a specific functional screen or specific functional screens of a plurality of functional screens are selected based on an input event for selecting a content viewing area, exemplary embodiments of the present invention are not limited thereto. That is, the terminal 100 may automatically select a functional screen operated by the user shortly before the flexible display 140 is folded, for example an area or a functional screen corresponding to a location where an input signal is generated or a location where an editing function is performed, from the plurality of functional screens.

As described above, according to the method of controlling an output of a screen of a flexible display and a terminal supporting the same according to exemplary embodiments of the present invention, a content viewing area designated by the user is automatically left in a specific display area of the deflected or folded flexible display 140 while at least one functional screen is provided. Accordingly, even when the user folds or deflects the flexible display 140 according to a situation, the present invention may provide support to continuously identify a content area to be noted.

In exemplary embodiments, the above-described terminal may further include various modules according to the type thereof. That is, the terminal may further include a near field communication module for near field communication in the case of a communication terminal, an interface for transmission and reception of data through wired or wireless communications of the terminal, an Internet communication module communicating with an Internet network to perform the Internet function, and a digital broadcasting module for receiving digital broadcasts and performing a reproduction function. The elements may be variously modified according to a convergence trend of digital devices and cannot be listed one by one, but elements equivalent to the above-described elements may be additionally included in the device. Further, the terminal of the present invention may exclude some elements from the above-described configuration or replace some elements with other elements according to the type thereof. This will be easily understood by those skilled in the art to which the present invention pertains.

The terminal according to exemplary embodiments of the present invention may include all information communication devices, all multimedia devices, and all application devices such as a Portable Multimedia Player (PMP), a digital broadcasting player, a Personal Digital Assistant (PDA), a music player (for example, an MP3 player), a portable game terminal, a smart phone, a notebook, and a handheld PC, including all mobile communication terminals operated based on communication protocols corresponding to various communication systems.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A terminal supporting control of an output of a screen of a flexible display, the terminal comprising:
   a flexible display configured such that at least a portion of the flexible display is deflected or folded;
   a sensor unit for collecting a sensor signal for detecting a location where the flexible display is deflected or folded; and
   a controller for controlling to determine a specific area of a functional screen or at least one functional screen from among a plurality of functional screens which are output before the flexible display is deflected or folded, as a content viewing area, when an input event is received, and for outputting the determined content viewing area in a specific display area of the folded flexible display.

2. The terminal of claim 1, wherein the controller selects the content viewing area based on a predefined gesture event generated on an area where the at least one functional screen of the plurality of functional screens is output.

3. The terminal of claim 1, wherein the controller selects the at least one functional screen from among the plurality of functional screens, which is situated in an area where a predefined imaginary sticker is disposed, as the content viewing area.

4. The terminal of claim 1, wherein the flexible display outputs the content viewing area in an area of the deflected or folded flexible display which is exposed to a user, or outputs the content viewing area in an area of the folded flexible display where an input event for selecting the content viewing area is generated, or outputs the content viewing area in an area of the folded flexible display which has a relatively wide range.

5. The terminal of claim 1, wherein the controller controls to resize an area of the functional screen which has been selected as the content viewing area such that the resized area of the functional screen corresponds to a specific display area of the area of the folded flexible display, and to output the resized area of the functional screen in the specific display area, and controls to divide the area of the functional screen selected as the content viewing area such that the divided area of the functional screen corresponds to the specific display area of the area of the folded display area and to output the divided area of the functional screen in the specific display area.

6. The terminal of claim 1, wherein the controller resizes at least one of the at least one functional screen from among the plurality of functional screens which has been selected as the content viewing area such that the resized size of the at least one functional screen corresponds to the display area of the flexible display.

7. The terminal of claim 6, wherein the controller differently applies a resizing ratio according to an occupancy ratio of a previous screen of the at least one functional screen from among the plurality of functional screens which has been selected as the content viewing area.

8. The terminal of claim 1, wherein the controller controls to temporarily pause or automatically end a function corresponding to a functional screen from among the plurality of functional screens which has not been selected as the content viewing area.

9. The terminal of claim 8, wherein the flexible display outputs a bookmark or a snapshot corresponding to a functional screen from among the plurality of functional screens which has not been selected as the content viewing area at one side thereof.

10. The terminal of claim 1, wherein if a sensor signal due to rolling of the flexible display is received, the controller controls to move and display the area selected as the content viewing area as the flexible display is rolled along the display area.

11. A method of controlling an output of a screen of a flexible display, the method comprising:
as an input event is received, determining a specific area of a functional screen output on a flexible display or at least one functional screen from among a plurality of functional screens as a content viewing area;
identifying deflection or folding of the flexible display; and
outputting the area of the functional screen which has been determined as the content viewing area, or the at least one functional screen from among a plurality of functional screens in a predetermined area of the deflected or folded flexible display.

12. The method of claim 11, wherein the determining of the area of the functional screen comprises at least one of:
selecting the content viewing area based on a specific gesture event generated in an area where at least one of the at least one functional screen from among the plurality of functional screens is output; and
selecting a functional screen from among the plurality of functional screens which corresponds to an area in which a predefined imaginary sticker is disposed as a content viewing area.

13. The method of claim 11, wherein the outputting of the area of the functional screen comprises at least one of:
outputting the content viewing area in an area of the area of the deflected or folded flexible display which is exposed to a user;
outputting the content viewing area in an area of the folded flexible display in which an input event for selecting the content viewing area is generated; and
outputting the content viewing area in an area of the flexible display of the folded flexible display which has a relatively wide range.

14. The method of claim 11, wherein the outputting of the area of the functional screen comprises at least one of:
resizing an area of the functional screen selected as the content viewing area such that the resized area of the functional screen corresponds to a specific display area of the area of the folded flexible display, and outputting an area of the resized functional screen in the specific display area; and
dividing an area of the functional screen selected as the content viewing area such that the divided area of the functional screen corresponds to a specific display area of the area of the folded flexible display, and outputting the divided area of the functional screen in the specific display area.

15. The method of claim 11, wherein a size of at least one of the at least one functional screen from among the plurality of functional screens which has been selected as the content viewing area and outputting the resized functional screen in the specific display area.

16. The method of claim 15, further comprising:
differently applying a resizing ratio according to an occupancy ratio of a previous screen of the at least one functional screen from among the plurality of functional screens selected as the content viewing area.

17. The method of claim 11, wherein the outputting of the area of the functional screen comprises outputting only an area corresponding to a starting point and an ending point of an input event for selecting the content viewing area in the specific functional screen in the display area of the folded flexible display.

18. The method of claim 11, further comprising:
temporarily pausing or automatically ending a function corresponding to a functional screen from among the plurality of functional screens which has not be selected as the content viewing area.

19. The method of claim 18, further comprising:
collecting a bookmark or a snapshot corresponding to a functional screen from among the plurality of functional screens which has not been selected as the content viewing area; and
outputting the collected bookmark or snapshot at one side of the area where the content viewing area is output.

20. A method of controlling an output of a screen of a flexible display, the method comprising:
determining a specific area of a functional screen output in the flexible display or at least one functional screen from among a plurality of functional screens as a content viewing area as an input event is received;
collecting a sensor signal according to a rolling of the flexible display; and
moving the area selected as the content viewing area in a display area according to the rolling of the flexible display to display the moved area.

* * * * *